Patented Feb. 24, 1942

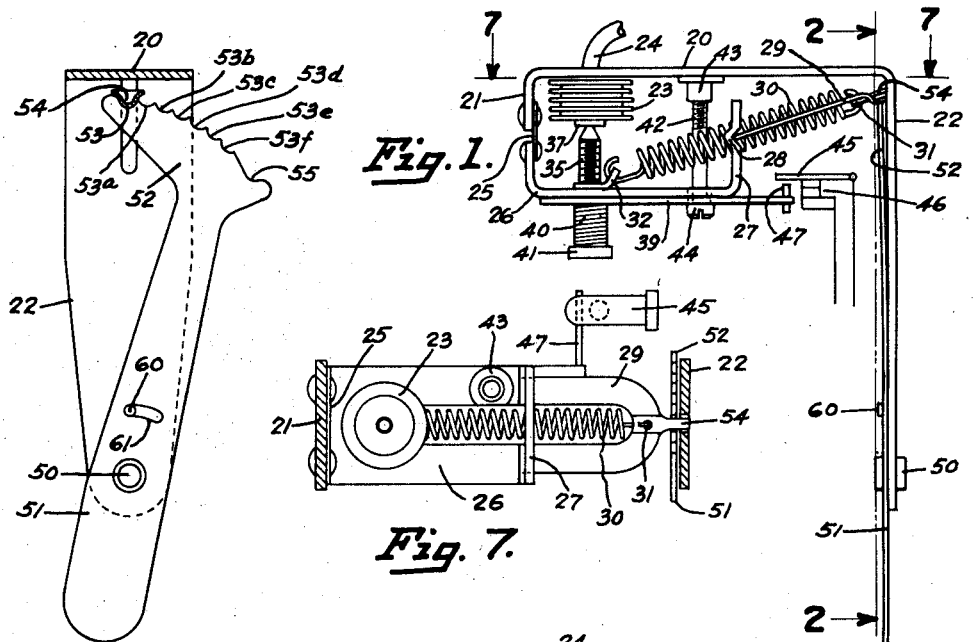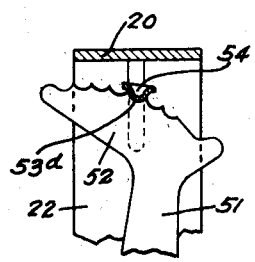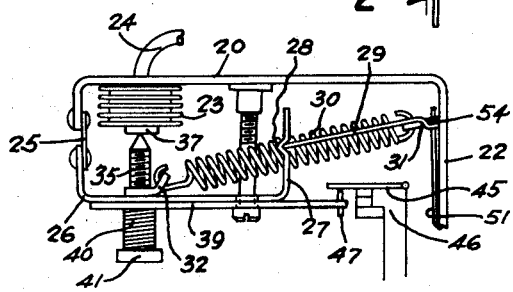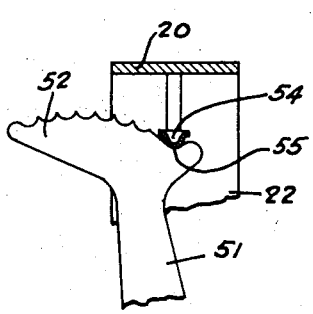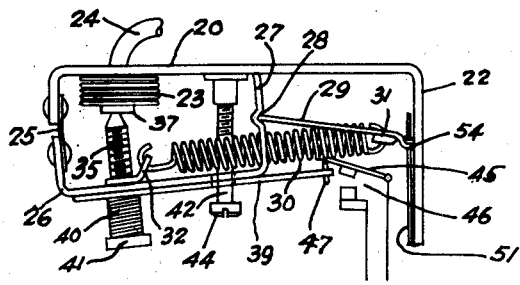

2,274,312

UNITED STATES PATENT OFFICE 2,274,312

THERMOSTATIC SWITCH

Calvin J. Werner, Dayton, Ohio, assignor to General Motors Corporation, Detroit, Mich., a corporation of Delaware Application January 21, 1941, Serial No. 375,188

6 Claims. (Cl. 200—83)

This invention relates to a temperature responsive control mechanism for an electric switch.

The control mechanism for the present invention is designed to open and close an electric switch particularly adapted to control the operation of an electric motor used as the motive power in either an electric refrigeration system, an air conditioning system or a room heating system.

In a refrigerating system for instance, the temperature responsive control mechanism acts in response to a predetermined lowering of the temperature within the refrigerator to open the switch with a quick snap action and stop the motor and thereby stop the refrigeration cycle. It is also adapted to close the switch with a quick snap action and again render the motor operative to effect refrigeration when the temperature within the refrigerator attains a predetermined high value. On the other hand when the temperature responsive control mechanism of the present invention is used with a room heating system it will act to turn off the electric motor by opening the switch in response to a predetermined high temperature having been attained and again close the switch and render the motor operative when a certain low temperature is reached.

It is among the objects of the present invention to provide a control mechanism of simple structure and design adapted to actuate a motor controlling switch with a quick snap action in accordance with variations in temperature.

It is a further object of the invention to provide such a switch controlling mechanism with adjusting means adapted to adjust the mechanism so that it will effect the control of the motor switch within predetermined varying limits of temperature changes.

These objects are attained by providing a temperature responsive control mechanism with a means actuated in response to temperature changes, said means being engaged by the one of two toggle arms which pivotally engage each other. One toggle arm is provided with a finger adapted to engage and operate the motor switch. A tension spring is connected between the two arms and urges one arm into operative engagement with the temperature responsive means. The device is provided with a manually operable lever or cam engaged by the other arm of the toggle, said lever or cam being adapted to adjust said other arm relatively to the said one arm of the toggle to shift with a snap action, the center line of action of the spring relatively to the pivotal point of engagement of said two arms, whereby the component force of the spring urging the one lever toward the thermostatically responsive means is varied thereby to vary the control of the mechanism.

Further objects and advantages of the present invention will be apparent from the following description, reference being had to the accompanying drawing wherein a preferred embodiment of the present invention is clearly shown.

In the drawing:

Fig. 1 is a side view of the device in elevation.

Fig. 2 is a view of a portion of the device shown in Fig. 1 and taken along the line 2—2 of Fig. 1.

Fig. 3 is a fragmentary view similar to Fig. 1, showing the device in a different position of adjustment.

Fig. 4 is a fragmentary view similar to Fig. 2 showing the manually adjustable member of the device in the newly adjusted position as indicated in Fig. 3.

Fig. 5 is a view similar to Fig. 3 showing the mechanism in an adjusted position in which the entire force of the spring is exerted upon the thermostatic device rendering it ineffective to respond to temperature changes and maintaining the motor control switch open.

Fig. 6 is a fragmentary view of the device showing the manually adjustable member in the position to place the mechanism in the adjustment as shown in Fig. 5, and Fig. 7 is a fragmentary sectional view of Fig. 1 taken along line 7—7.

Referring to the drawing, the mechanism includes a bracket having a portion 20 and two portions 21 and 22 angular to the portion 20. The temperature responsive means is shown in the form of a bellows 23 secured to the bracket portion 20 in any suitable manner. A tube 24 in communication with the interior of the bellows 23 leads to the region in which temperature is to be controlled and is provided with the normal tube or enlarged portion of any standard design and not necessary to be shown. This tube with its enlarged portion, not shown, and the bellows 23 is filled with any suitable fluid or gas which will expand in response to increasing temperatures and contract in response to decreasing temperatures. From this it may be seen that as temperatures within the region to be controlled drop to a predetermined value the bellows 23 will contract while on the other hand when such temperatures rise, the bellows 23 will be caused to expand. When used in connection with an electric refrigerating system the region to be controlled will be preferably within the area within the refrigerator or the area adjacent the evaporator while when used in connection with air conditioning or a heating system the region to be controlled will be a room or chamber to which the tube 24 leads.

A resilient blade spring 25 has one end secured to the angular portion 21 of the bracket while its other end is secured to one end of a movable toggle arm 26 thus hingedly connecting this end of the toggle arm to the bracket portion 21. The opposite end of the toggle arm 26 has an angular portion 27 provided with a V-shaped notch 28 in which one end of the toggle arm 29 is pivotally seated. The toggle arm 29 is maintained in pivotal engagement with the V-shaped notch 28 of toggle arm 26 by a spring 30, one end of which is connected with the free end of the toggle arm 29 as at 31, the other end of said spring being anchored to an ear 32 secured to the toggle arm 26 in any suitable manner. A screw stud 35 is threadedly carried by the toggle arm 26 and has its inner end operatively engaging a base plate 37 secured to the movable end wall of the bellows 23.

The toggle arm 26 supports a finger 39, yieldably urged against the toggle arm by a spring 40 interposed between the finger 39 and the head 41 of the screw stud 35. A stop screw 42, threadedly received by the threaded collar 43 secured to bracket portion 20, has a head 44 providing a stop against which the finger 39 rests thus movement thereof, as well as toggle arm 26 away from the bracket portion 20 is limited by this screw head 44. Finger 39 has an insulating end portion 47 adapted to engage the movable contact arm 45 of the motor control switch 46.

The portion 22 of the bracket has a pivot pin 50 rotatably supporting the manually operable lever-cam 51. This lever-cam 51 has a head portion 52 provided with a variable cam surface in which a plurality of the spaced notches 53, 53a, 53c, 53d, 53e and 53f are provided. These notches are arranged relative to each other as will be seen in Fig. 2, so that the notch 53 is the greatest distance away from the center of the pivot pin 50 while the distance between each successive notch and the center of the pivot pin 50 gradually diminishes.

The free end of the toggle arm 29 has an extension 54 which is adapted to be received by the various notches 53. As shown in Fig. 2, when notch 53 is engaged by the extension 54 of the toggle arm 29 said toggle arm will be held at its greatest distance away from the center of pivot pin 50. When said toggle extension 54 is in notch 53f it will have permitted toggle arm 29 to move more adjacent said pivot pin 50. The lever 51 has another notch 55 which is not in the line of gradual descent of the notches 53 to 53f inclusive, but provides an abrupt offset adapted to be engaged by the extension 54 of toggle arm 29 when the lever 51 is moved to its extreme counterclockwise position. As shown in Fig. 2 extreme movement of lever 51 in either direction is limited by the stop pin 60 carried by the bracket portion 22 which pin extends into the slot 61 coaxial with the pivot pin 50.

Figs. 1 and 2 show the mechanism set in its one extreme position, that is, lever 51 is set in its extreme clockwise position as governed by the slot 61 and pin 60. In this position the extension 54 of toggle arm 29 is resting in the notch 53 which is the notch in the cam surface of lever head 52 spaced most remotely from pivot pin 50 of said lever. Under these conditions the line of action of spring 30, or more specifically the imaginary line passing from the pivot 32, where spring 30 is secured to toggle lever 26 to the point 31 where the spring 30 is attached to the toggle lever 29 approaches for closest alignment with the pivotal point of connection between the said toggle levers 26 and 29, or more particularly the bottom of the V-shaped portion 28 of the portion 27 of toggle arm 26. In this position spring 30 has a minimum component tending to urge the toggle arm 26 counterclockwise about its hinged connection 25 with the bracket portion 21 and therefore practically no spring pressure is exerted through the screw stud 35 against the temperature responsive means or bellows 23. By this adjustment the lowest predetermined temperature attainable in a refrigerator system using this control device will be required to decrease the bellows pressure sufficiently to cause movement of the toggle arm 26 counterclockwise so that its fingers 39—47 will engage and actuate the contact arm 45 to open the switch 46 and thereby to stop the electric motor.

As the lever 51 is moved counterclockwise about its pivot pin 50 the extension 54 of toggle arm 29 will enter the successive notches 53a to 53f. Thus as said toggle arm extension 54 enters the notches 53a to 53f successively the toggle arm is moved clockwise about its pivotal engagement in notch 28 of the toggle lever 26 thereby moving the center line of action of the spring 30 out of substantially direct alignment with the bottom of said notch 28 and more particularly downwardly beneath said point of the pivotal connection between the two toggle arms. For instance, in Fig. 4 the arm 51 is shown in a position in which the toggle arm extension 54 engages the notch 53d. Fig. 3 shows the position of the toggle arm 29 when the lever has been moved to this position. Under these circumstances the center line of action of spring 30 lies a greater distance beneath the bottom of the V-shaped notch 28 in toggle arm 26, or more specifically the center line of action of spring 30 is offset and beneath the pivotal point of engagement between the two toggle arms 29 and 26. As a result a component of spring force is set up which urges the toggle 26 counterclockwise on its pivotal spring 25 consequently resulting in a predetermined increased pressure being exerted through the screw stud 35 against the plate 37 on the bottom movable end wall of the bellows 23. This component of the spring force is of itself insufficient to overcome the normal expansion of the charged bellows, however, when lowering temperatures cause a contraction of the gas or fluid in said bellows such contraction, assisted by the force of the toggle arm screw 35 against the bottom of the bellows will cause the bellows to decrease in length. At a predetermined point in such bellows movement the toggle arm 26 will have moved sufficiently to open switch 46. With the device adjusted as shown in Figs. 3 and 4 the bellows will be collapsed at a higher temperature than under the conditions as shown and described in connection with Figs. 1 and 2 inasmuch as in the adjustment shown in Figs. 3 and 4 a component of the spring pressure is exerting a greater force upon the bellows 23 tending to collapse it, thus permitting a temperature of higher value than that required in the adjustment of Fig. 1 to cause switch opening movement of the bellows 23. For instance, if a temperature of 32° would be required to collapse the bellows 23 of Fig. 1 sufficiently to result in movement of the toggle arms 26 and 29 to open the switch 46 then perhaps a temperature of approximately 40° might be sufficiently low to cause movement of the bellows 23 to result in opening said switch 46 inasmuch as the spring 30 is exerting an increased component of its force against the bellows 37 through the stud 35 tending to move said bellows 23.

When, as shown in Fig. 6, the hand operated lever 51 is moved into the position in which the toggle arm extension 54 rests in the notch 55, then the toggle arm 29 is moved to its extreme angular position in which the line of action of spring 30 is moved the greatest distance beneath the pivotal point of engagement of the levers 29 and 26, so that the greatest component of the spring force is exerted through screw stud 35 against the plate 37 on the bottom movable wall of the bellows 23. This component of the spring force is sufficiently strong in itself to collapse the bellows as shown in Fig. 5, under which circumstances neither a lowering or a rising temperature may affect the bellows. Thus it may be seen that regardless of the temperature changes when the mechanism is adjusted as shown in Figs. 5 and 6 the spring 30 will maintain the bellows and the toggle arms so that the finger 39 of toggle arm 26 will hold the switch 46 completely open, thus rendering the electric motor completely inoperative until the arm 51 has been moved so that the extension 54 of the toggle arm 29 will again seat in any one of the series of notches 53. When the extension 54 of the toggle arm 29 rests in any one of the series of notches marked 53 to 53f inclusive the component of spring force is not sufficient alone to actuate the bellows to permit toggle arm movement to open the switch. It is only when the said extension 54 is moved into the notch 55 that the spring force component is of sufficient strength in itself to collapse the bellows and thereby cause switch opening movement of the toggle arm 26. Inasmuch as the center line of action of spring 30 never passes above the pivotal point 28 of toggle arms 26 and 29 but is constantly beneath said point, it may clearly be seen that the spring 30 will never urge toggle arm extension 54 from engagement with the cam head of lever 51. On the contrary said spring constantly maintains said toggle extension upon said cam head 52.

The toggle, with its spring 30 is so constructed and arranged that it will act to operate the contacts of switch 46 with a quick, snap action. From the aforegoing it may be seen that applicant has provided a simple toggle mechanism with an interconnected spring which normally urges one toggle arm into operative engagement with a means responsive to temperature changes. He has provided a simple lever with a variable cam surface engaged by one of the toggle arms for purposes of variably shifting said arm so as to vary the relative position of the center line of spring action to the pivotal engagement of the two toggle arms whereby to vary the component of the spring force which component urges the one toggle arm toward and into operative engagement with said temperature responsive means whereby varying degrees of temperature are required to actuate said temperature responsive means to effect operation of the toggle arms and thereby open and close a motor controlling electric switch with a quick snap action. This is accomplished without substantially changing the spring length but by changing the geometry of the system. The manually adjustable arm besides having a variable cam also is provided with an abrupt step-off portion which when brought into effect will so move the one toggle arm as to so shift the center line of spring action that its component force will be sufficient in itself to move the temperature responsive means into a position in which it is rendered ineffective.

Under these circumstances applicant's device will maintain his motor switch open, temperature variations having no effect on the bellows to again close said switch unless the lever 51 is actuated so that the extension 54 is again moved into one of the series of notches 53 at which time a predetermined rise in temperature will result in an expansion of the gas or fluid in said bellows to expand it and consequently move toggle arm 26 to again close the motor switch 46.

While the embodiment of the present invention as herein disclosed, constitutes a preferred form, it is to be understood that other forms might be adopted, all coming within the scope of the claims which follow.

What is claimed is as follows:

1. A temperature responsive switch controlling mechanism comprising, means actuated in response to temperature changes, a toggle comprising two arms, one pivotally supporting the other, said one arm engaging said means and having a finger for operating the switch, a tension spring connected between the arms and exerting a component of its force to urge the one arm toward and against the said means, and a manually operable member engaged by the other toggle arm, and adapted, when moved through a portion of its range of travel, to adjust said other arm gradually to shift the line of action of the spring and thereby correspondingly vary the component of the spring force upon said one toggle arm, said member, when moved through another portion of its range of travel being adopted to adjust said other toggle arm so that the component of the spring force will move said one arm to render the temperature responsive means completely inoperative and to open the switch with a snap action.

2. A temperature responsive switch controlling mechanism comprising, means actuated in response to temperature changes, a toggle comprising two arms, one pivotally supporting the other, said one arm engaging said means and having a finger for operating the switch, a tension spring connected between the arms and exerting a component of its force to urge the one arm toward and against the said means, and a manually operable member having a variable cam surface provided with a plurality of notches adapted to receive a portion of the other of said toggle arms, actuation of said member selectively adjusting said other arm to shift the center line of action of the spring and thereby vary the component of its force urging the one of said toggle arms against the temperature responsive means.

3. A temperature responsive switch controlling mechanism comprising, a toggle having two pivotally engaging arms one of which is hingedly anchored at one end and provided with a switch operating finger and a tension spring urging said arms into pivotal engagement; a temperature responsive actuator; means operatively connecting said actuator with the hingedly anchored arm of the toggle; and a manually operable adjuster engaged by the free end of the other arm of the toggle for adjusting said arm to vary the force of the toggle spring urging the hingedly anchored arm toward the actuator.

4. A temperature responsive switch controlling device comprising, a toggle having an end of one of its arms hingedly anchored, the other end pivotally supporting the second arm and a tension spring interposed between said arms, the hingedly anchored arm having a switch controlling finger; a temperature responsive actuator operatively connected to the hingedly anchored toggle arm; and an adjustable abutment for the free end of the second toggle arm adapted to move said arm to shift the center of action of the toggle spring whereby to vary the force of said spring urging the first arm toward the temperature responsive actuator.

5. A temperature responsive switch controlling device comprising, a toggle, one arm of which is hingedly anchored and has the second arm urged against it by a tension spring interposed between the arms; a switch controlling finger on the said one arm; a thermal actuator; adjustable means connecting the thermal actuator operatively with the said one toggle arm adjacent its hinged anchorage; and an adjustable cam engaged by the second arm and operable to move said second arm relatively to the first to vary the force of the toggle upon the thermal actuator.

6. A temperature responsive switch controlling device comprising, a frame; a toggle having one of its arms hingedly secured to said frame and provided with a switch controlling finger, the second arm of the toggle pivotally engaging the first arm and being urged thereupon by a tension spring; a thermal actuator on said frame; an adjustable stud carried by the first arm and operatively engaging the thermal actuator; and a manually adjustable lever having a variable cam surface engaged by the free end of the second toggle arm for selectively moving said arm relatively to the first toggle arm to shift the line of action of the toggle spring and thereby correspondingly vary the component of the spring force urging said first toggle arm toward the thermal actuator.

CALVIN J. WERNER.